United States Patent [19]

Jones

[11] 4,060,799
[45] Nov. 29, 1977

[54] TWO-SPEED RESOLVER EMPLOYING DIFFERENTIAL REDUCTION TECHNIQUES

[75] Inventor: Donald H. Jones, Pittsburgh, Pa.

[73] Assignee: Control Systems Research, Inc., Pittsburgh, Pa.

[21] Appl. No.: 503,431

[22] Filed: Sept. 5, 1974

[51] Int. Cl.$^2$ .......................................... G08C 19/48
[52] U.S. Cl. .................................. 340/198; 318/692; 323/53; 336/120; 340/195
[58] Field of Search ................. 340/195, 198, 196, 62; 323/117, 118, 52, 53; 235/92 MP; 318/595, 661, 690, 692; 324/167; 336/120

[56] References Cited

U.S. PATENT DOCUMENTS

| | | | |
|---|---|---|---|
| 2,713,143 | 7/1955 | Bock | 323/52 |
| 3,317,874 | 5/1967 | Honsinger | 336/120 |
| 3,348,181 | 10/1967 | Stromswold | 336/120 |
| 3,353,095 | 11/1967 | Farrand | 323/53 |
| 3,501,758 | 3/1970 | James et al. | 340/198 |
| 3,537,086 | 11/1970 | Andresen | 340/198 |
| 3,885,209 | 5/1975 | Lazarus | 318/690 |

Primary Examiner—John W. Caldwell, Sr.
Assistant Examiner—James J. Groody
Attorney, Agent, or Firm—Robert D. Yeager; Howard G. Massung

[57] ABSTRACT

A two-speed resolver system wherein the rotor of a fine brushless resolver which is directly connected to the shaft to be instrumented is connected to the rotor of a coarse resolver so that the rotor of the coarse brushless resolver rotates at a proportional but different rate than the fine resolver and the electrical output of the fine resolver which represents the position of the input shaft is fed to the electrical input on the coarse resolver and combined with the mechanical input to the coarse resolver to provide a signal out of the coarse resolver which indicates a predetermined fraction of angular rotation for each revolution of the rotor of the fine resolver. The disclosed two-speed resolver system utilizes brushless resolvers wherein the electrical connections to the rotors are through brushless rotary transformers. Two gears having a different number of teeth can be used to couple the rotor of the fine resolver to the rotor of the coarse resolver. The difference between the coarse resolver mechanical rotation and the fine resolver electrical output when subtracted by the coarse resolver determines the fractional rotation indicated by the coarse resolver for each revolution of the fine resolver rotor. The fine resolver is connected to provide sine and cosine representations of the mechanical angular input to its rotor. These sine and cosine angular indications can be fed to the stator windings or rotor windings on the coarse resolver and the coarse resolver can be connected to provide an output signal which represents the difference between the revolution of its rotor and the sine and cosine input from the fine resolver. This output can be made to indicate a predetermined number of degrees of rotation for each revolution of the input shaft.

12 Claims, 6 Drawing Figures

4,060,799

TWO-SPEED RESOLVER EMPLOYING DIFFERENTIAL REDUCTION TECHNIQUES

BACKGROUND OF THE INVENTION

1. Field of the Invention

This invention relates to a two-speed resolver; and more particularly, to a resolver having both a fine and coarse sensing means and employing differential reduction techniques which utilize mechanical and electrical interconnection of the fine and coarse sensing means.

2. Description of the Prior Art

A resolver is an angle transducer which includes a rotor shaft containing two transformer-like windings disposed 90° apart. The resolver also contains a pair of stationary transformer-like windings called the stator windings. In normal application the resolver shaft is directly coupled to the shaft which is to be instrumented in terms of angular position. The four windings are then connected in various arrangements to provide desired output for the given application. In utilizing a single resolver in an absolute positioning determining system with a shaft rotatable over multiple revolutions, an ambiguity exists from one revolution of the resolver to the next. That is, a single speed resolver can provide unique electrical signals relative to the position of a shaft within one revolution but cannot differentiate between revolutions. A single resolver directly coupled to a shaft can only provide positioning information over one particular revolution.

In order to provide information over a multiple number of revolutions and to know precisely which revolution is being monitored, a two-speed resolver system must be employed. In a two-speed resolver system a fine resolver is used for indicating the angular position of the instrumented shaft within the revolution being observed, and a coarse resolver is provided to determine which revolution is being checked.

A synchro or resolver is basically an angular position transducer which transmits information in the form of amplitude modulated sine wave signals. When excited, by a reference or carrier voltage of the form $E \sin \omega_t$, a typical resolver gives a two-phase signal as follows:

$$V_s = (K_s E \sin \theta) \sin (\omega_t + \psi_s)$$

$$V_c = (K_c E \cos \theta) \sin (\omega_t + \psi_c)$$

wherein:

$\theta$ is the mechanical input to the rotor $K_s$ and $K_c$ are the transmission factors of the resolver and are normally equal $\psi_s$ and $\psi_c$ are the phase shifts of the output signals and for a good resolver are practically zero.

Normally the desired angular positional information is carried by the ratio of two output signals $V_s$ and $V_c$. Since the desired information out of the resolver is the $\sin \theta$ and $\cos \theta$, and the additional terms are in this sense surplusage, the resolver output is usually referred to for simplicity as $\sin \theta$ and $\cos \theta$, and this conventional terminology will be used.

Two-speed resolver systems are well known in the art. They have been widely used to provide electrical instrumentation for the determination of the position of a rotary shaft in applications where information is needed as to absolute shaft position over multiple revolutions. A typical two-speed resolver consists of two resolvers mechanically interconnected by a speed reducing means usually in the form of a gear reducer. The rotary shaft to be instrumented is generally coupled directy to a fine resolver, to mechanically provide input angle data representing the angular position of the shaft. The fine resolver directly coupled to the shaft is used to provide electrical signals over any given single revolution of the shaft indicating the angular orientation with a high degree of accuracy. By an appropriate gear reduction mechanism, angle theta, the angular position of the instrumented shaft, is mechanically transmitted to the input shaft of the second resolver, the coarse resolver. The coarse resolver provides electrical signals which indicate the total number of revolutions of the shaft to be instrumented. This combination of the fine resolver and coarse resolver thus provides electrical signals indicating the absolute position of the instrumented shaft over multiple revolutions.

For example, a typical two-speed resolver system may have a ratio between fine and coarse resolvers of 100:1. In such a system, the shaft to be instrumented can have a total rotation of 100 revolutions while the coarse resolver rotates only one revolution; thus, the resolver system provides non-ambiguous information for total shaft travel of 100 revolutions.

The principal difficulty in achieving large reduction ratios (of the order of magnitude of 100:1) in present day two-speed resolvers is with the gear system. In a normal system, a reduction of 5:1 is the largest practical ratio to obtain for a pair of gears. Thus, for a two-speed resolver having a 100:1 reduction ratio, as many as six gears and two additional bearing support systems may be required in order to achieve a reasonable size housing and the necessary precision. Since the gears are running at substantially different rates and substantial accuracy is required, gear wear can present a problem. In many cases cost of the precision gear train necessary to operate prior art two-speed resolver systems may exceed the cost of the two-speed resolvers themselves.

SUMMARY OF THE INVENTION

The present invention overcomes disadvantages and objections associated with the prior art two-speed resolvers. The disclosed invention is capable of generating the desired large ratio between the fine and coarse resolver output by utilizing characteristics of the resolver in a unique single-pass two-gear arrangement with the resolvers electrically interconnected. The disclosed invention utilizes the fact that a resolver will subtract an angle mechanically applied to its rotor from an angle applied electrically to its input windings, which can be either the rotor or stator windings, and provide an output electrical signal which indicates the difference. It is to be understood that the teaching of this invention can be applied to any sinusoidal position transducer. When the term resolver is used herein it is intended to include: synchro, induction potentiometer resolver transmitter, control transformer, differential control transformer and any other sinusoidal position transducer.

The fine resolver is directly connected to the shaft to be instrumented and provides an output signal usually in sine, cosine form of the angular position of the input shaft. The rotor of the coarse resolver is connected to the rotor of the fine resolver to be rotated a fraction of a revolution for each revolution of the fine resolver. The rotor of the coarse resolver could also be rotated further than the rotor of the fine resolver; as long as their rotation is different, the teaching of this invention will apply. The sine, cosine representations of the angular input to the fine resolver, which are used to determine angular position over any given revolution are also fed to the electrical input terminals on the coarse resolver. The coarse resolver as connected functions as a differential angle subtractor and subtracts the fractional mechanical angular input from the full electrical angular input and provides a proportional signal equal to the difference. Thus, if the mechanical input to the coarse resolver is 0.99 or 1.01 of the mechanical input to the fine resolver, the angular electrical output signal of the coarse resolver will represent a rotation of 0.01 revolutions for every revolution of the input shaft. Thus by properly mechanically and electrically interconnecting the fine and coarse resolvers, a signal from the fine resolver is provided indicating an angular position over a given revolution and a signal from the coarse resolver is provided indicating the revolution to which the output of the fine resolver pertains. Thus, what is obtained in the prior art is here provided utilizing only two gears, which substantially reduces the cost of the two-speed resolving system while providing for increased accuracy, reduced maintenance and better reliability.

For example, to obtain a 100:1 ratio between the coarse and fine resolver output utilizing the teaching of this invention, the output of the fine resolver is applied not only for input to the instrumentation system, but also for input to the windings of the coarse resolver. Normally, the input to the coarse resolver is through the rotor windings, but if desired the stator windings can be used. The single-pass gear ratio connecting the shaft of the rotor to the resolver is accomplished through a 99:100 ratio which causes the coarse resolver to rotate at a speed of 0.99 times the input shaft speed. As previously described, the coarse resolver acts as an angle subtractor by subtracting the actual mechanical rotation of its shaft from the electrical inputs corresponding to the sine and cosine of the angle imposed on its rotor windings. When the electrical input to the coarse resolver is equivalent to the rotation of the input shaft and from this is subtracted a mechanical input equal to 0.99 times rotation of the input shaft, the output of the coarse resolver is equal to 0.01 times the mechanical input and this is precisely the same output signal that is derived from the prior art two-speed resolver system which utilizes many additional gears and bearing systems. The desired ratio of the output of the coarse resolver to the input of the fine resolver can be achieved by appropriately choosing the ratio of the mechanical connection between the fine resolver rotor and the coarse resolver rotor. In all cases, this ratio can be theoretically achieved by using only two gears.

While the teaching of this invention has been described for a two-speed resolver system, it can readily be seen that it can apply to a system using more than two resolvers. For some applications it may be desirable that the output of the second resolver be the sum, rather than the difference, of its electrical and mechanical inputs. By properly connecting the resolvers any desired algebraic sum can be obtained.

The resolvers used for practicing this invention can be of the conventional type using slip rings and brushes for inputs to the rotor windings, or of the superior brushless variety which incorporate a brushless rotary transformer for providing access to all rotor signals.

It is an object of this invention to provide a method using two brushless resolvers for determining the absolute position of a member rotatable over a plurality of revolutions utilizing only two gears and electrical interconnection of the resolvers.

It is a further object of this invention to provide a two-speed resolver system which is simpler and more reliable than now provided.

It is a further object of this invention to disclose a two-speed resolver system which can be of any desired ratio between the fine and coarse resolver while utilizing only a two-gear system and not requiring a separate gear reducer.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENT

A resolver is basically an angle transducer and is well known in the art. Generally, a resolver includes a rotor having two sets of spaced apart windings and a stator also having two sets of spaced apart windings. These windings are called rotor windings and stator windings respectively. The rotor and stator windings may be variously configured and interconnected by those skilled in the art to function in any given application.

The operation of a resolver may be best understood by considering it as an angle subtractor. One angle input to the resolver is from the shaft to be instrumented and this is a mechanical input $\theta$ (theta). A resolver can also accept an electrical input, impressed either on the stator windings or rotor windings, which will be referred to as angle ($\alpha$) (alpha). In actual practice, angle $\alpha$ is input to the resolver as voltages which correspond to the sine and cosine of $\alpha$.

Assuming that angle $\alpha$ is input to the rotor windings and angle $\theta$ is input mechanically via the rotor through a coupling from the shaft to be instrumented, it is well known that voltages will be induced in the two stator windings proportional to the sine and cosine, respectively, of the difference between angles $\theta$ and $\alpha$. Expressed mathematically, the information output of one stator winding will be $$Es_1 = \sin(\alpha - \theta)$$

and the other stator winding output will be $$Es_2 = \cos(\alpha - \theta).$$

It can thus be seen that the resolver subtracts the actual mechanical rotation of its shaft ($\theta$) from the electrical inputs corresponding to the sine and cosine of an angle impressed on its rotor windings (α). By properly connecting the resolver the electrical input angle α could if desired be subtracted from the mechanical input θ.

Figure 1:
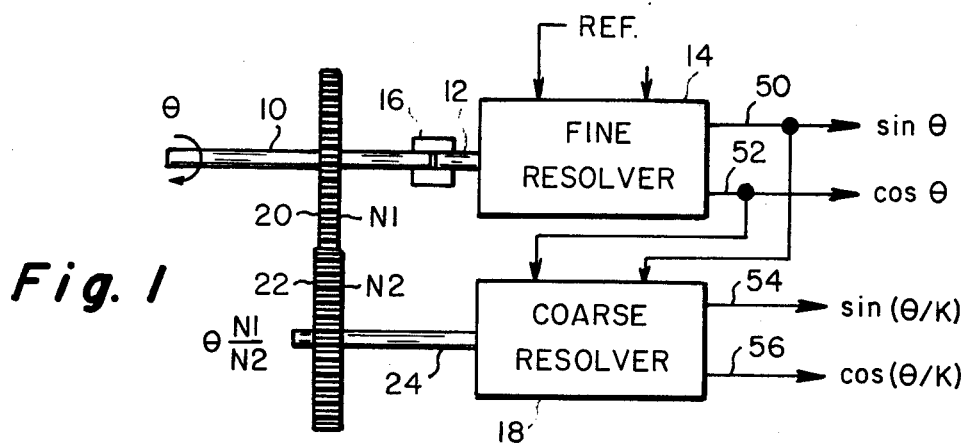
FIG. 1 is a view of a two-speed resolver system utilizing the teaching of the present invention.
Figure 2:
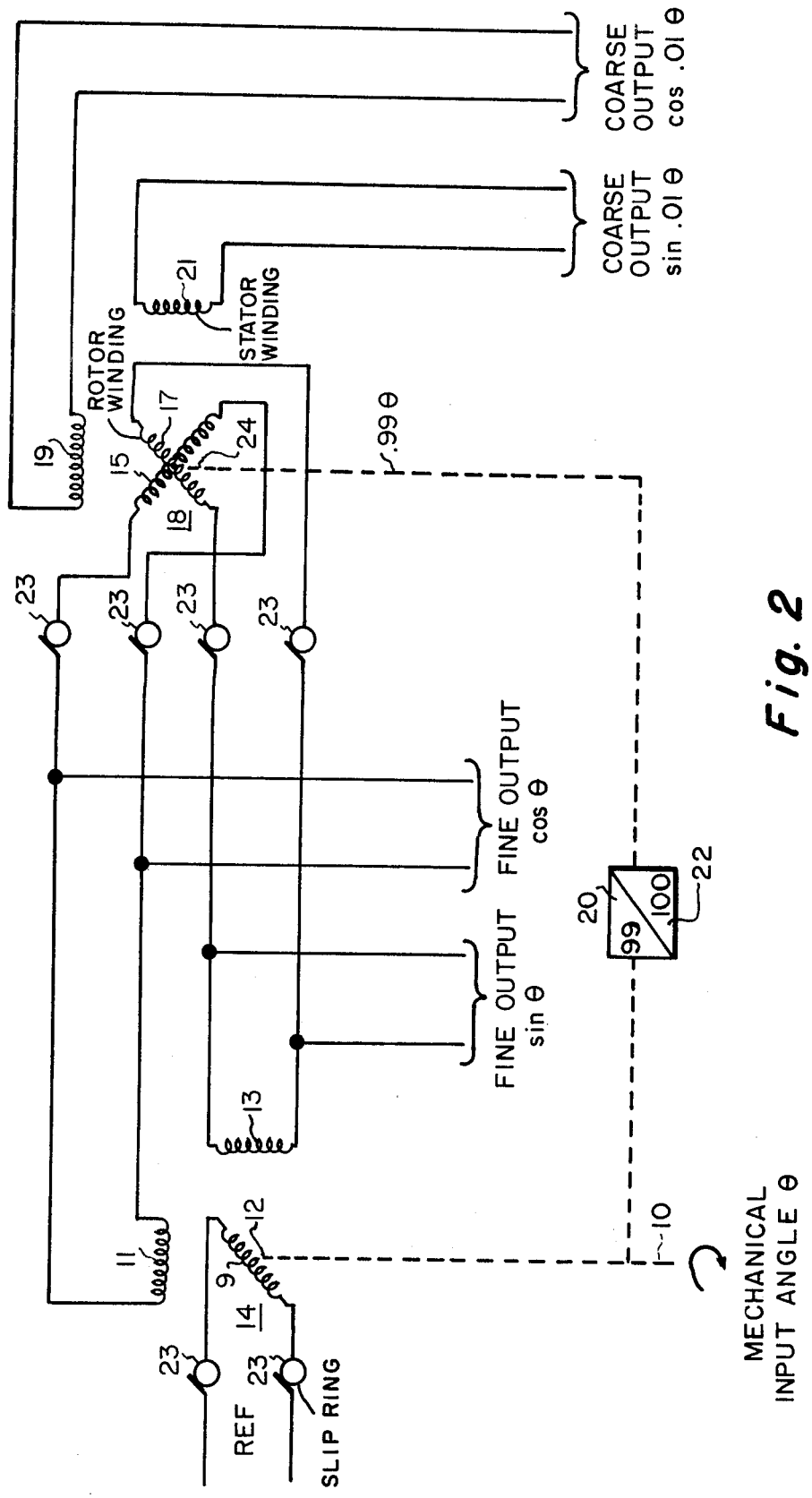
FIG. 2 is a view similar to FIG. 1 showing schematically the electrical interconnections of the fine and coarse resolvers.
Figure 5:
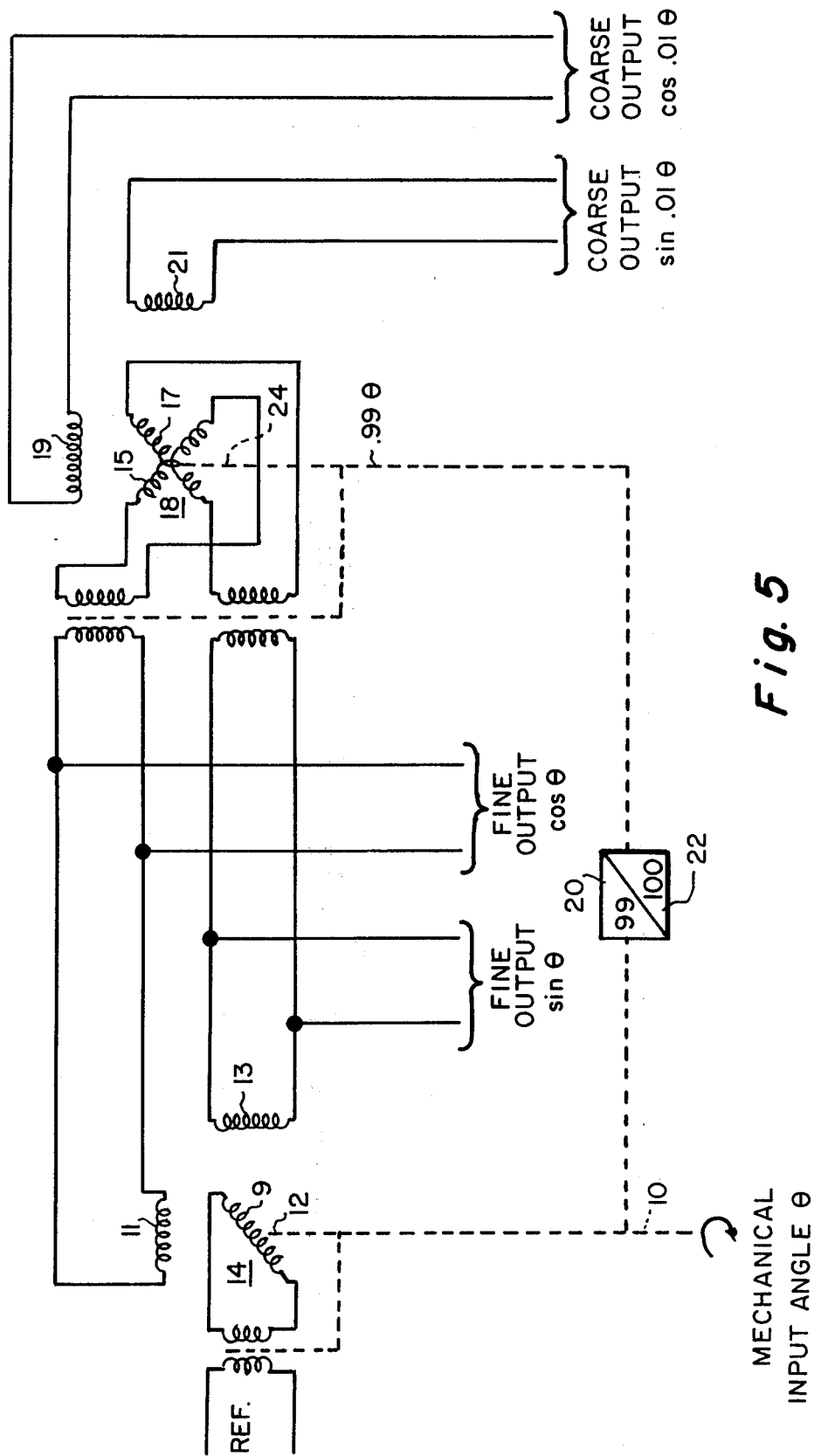
FIG. 5 is similar to FIG. 2, but using brushless resolvers.

Referring to FIGS. 1, 2 and 5, θ represents the angular position of a rotatable shaft 10 to be instrumented by means of the present invention. Shaft 10 is mechanically connected to rotor 12 of a first resolver 14 (shown in block diagram form in FIG. 1) through coupling 16. Angle θ is mechanically transmitted to a second resolver 18 by means of a pair of gears 20 and 22. Gear 20 is mounted on shaft 10 and engages gear 22 mounted on the input shaft 24 of resolver 18. As described hereinafter, gears 20 and 22 operate to reduce angle θ by a value equal to the ratio of the number of teeth in gear 20 (expressed as $N_1$) to the number of teeth in gear 22 (expressed as $N_2$). Thus, mathematically, Mechanical Input to Resolver 18 = $\theta\, N_1/N_2$ Angle θ, reduced by the value $N_1/N_2$, thereby becomes the mechanical input to resolver 18.

As shown in FIG. 1, resolver 14 is termed the "fine" and is intended to provide an electrical output corresponding to the angular position of shaft 10 over one revolution. Resolver 18 is termed the "coarse" resolver and is intended to provide electrical outputs which indicate the number of revolutions through which shaft 10 has turned. That is, the coarse resolver 18 indicates the revolution about which the fine resolver 14 is providing accurate detailed information. The manner and method by which the fine and coarse resolvers provide these outputs is the subject of this invention and will now be explained in detail.

Figure 3:
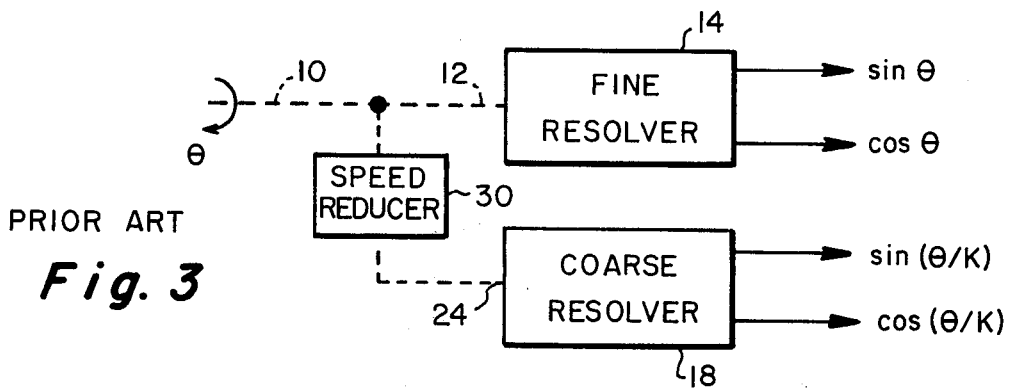
FIG. 3 is a block diagram of a prior art two-speed resolver system.
Figure 4:
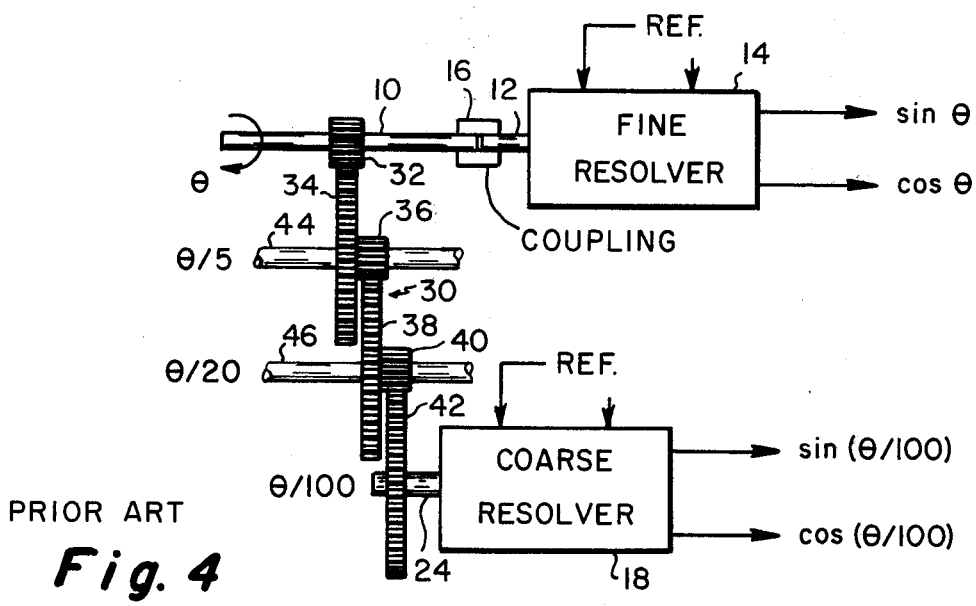
FIG. 4 is a drawing of a prior art 100:1 two-speed resolver system.

In the operation of a two-speed resolver system, information is desired as to the exact position of shaft 10 over a predetermined number of multiple revolutions. In the prior art construction in order to provide position information over a multiple number of revolutions and to know precisely which revolution the shaft is in at any given time, a two-shaped system as illustrated in FIGS. 3 and 4 is normally used. In this system, the input angle α is applied directly to a fine resolver 14. In addition, the prior art two-speed resolver employs a gear reducer 30 which will reduce the ratio of the input angle α by an appropriate reduction ratio $K$ and apply it to the input shaft 24 of the coarse resolver 18. Hence, it can readily be seen that as the input angle α rotates through more than one revolution the coarse resolver input shaft 24 will rotate through an angle of α divided by $K$. Thus, the output of the coarse resolver will be electrical signals equal to the sine of theta divided by $K$ ($\sin \theta/K$) and the cosine of theta divided by $K$ ($\cos \theta/K$). By determining the number of revolutions through which the shaft to be instrumented will rotate and selecting $K$ accordingly, it is possible to instrument the absolute position of the shaft 10 through its entire rotation. In the two-speed resolver operation, the fine resolver 14 will be used to generate information over any given single revolution with a high degree of accuracy and the coarse resolver will normally only be utilized to determine the particular revolution that the fine resolver is working on at any given time. A typical two-speed prior art resolver system is shown in FIG. 4. In this particular system, the ratio between the fine and the coarse resolver output is 100:1, so that the input angle can have a total rotation of 100 revolutions with the coarse resolver rotating only once. For example, with 100:1 ratio, for a rotation of 100°, the fine resolver will rotate 100° and the coarse resolver 18 will rotate only 1°. For an angle rotation of 10 revolutions, the fine resolver will indicate an angle of 0° whereas the coarse resolver 18 will indicate an angular rotation of 1/10 of a revolution of 36°. Hence, two-speed resolver systems have provided excellent resolution by virtue of the fine resolver and additional capability of increased total travel up to 100 revolutions, with non-ambiguous information provided by the coarse resolver 18. A prime difficulty in the prior art two-speed resolver system as illustrated in FIG. 4 is the high cost and precision required in obtaining the gear ratio between the fine resolver 14 and the coarse resolver 18. As shown in FIG. 4, a total of six gears 32, 34, 36, 38, 40 and 42 are required in addition to two bearing systems for supporting shafts 44 and 46, in order to generate the desired ratio of 100:1. The many gears are required since practically speaking a gear reduction of 5:1 is all that it is desirable to obtain between a pair of gears. Also, in this prior art construction where speed of the gears being rotated differs by a large amount, excessive gear wear can be a problem. Gear wear can present reliability and accuracy problems and cause expensive maintenance. In addition, in the normal case, the initial cost of providing the accurate and high gear ratio required is usually greater than the cost of the two resolvers.

The present invention discloses a novel and unique method and apparatus for generating the large precision ratio between the output of the fine resolver 14 and the coarse resolver 18 by utilizing fundamental characteristics of resolvers with a single-pass, two-gear arrangement. FIGS. 1, 2 and 5 illustrate a two-speed resolver system employing a differential reduction technique as disclosed in this invention. In this system, any ratio between the coarse and fine resolver is established by the unique technique of utilizing the output of the fine resolver not only for inputs to the instrumentation system but also for input to the windings of the coarse resolver.

Figure 6:
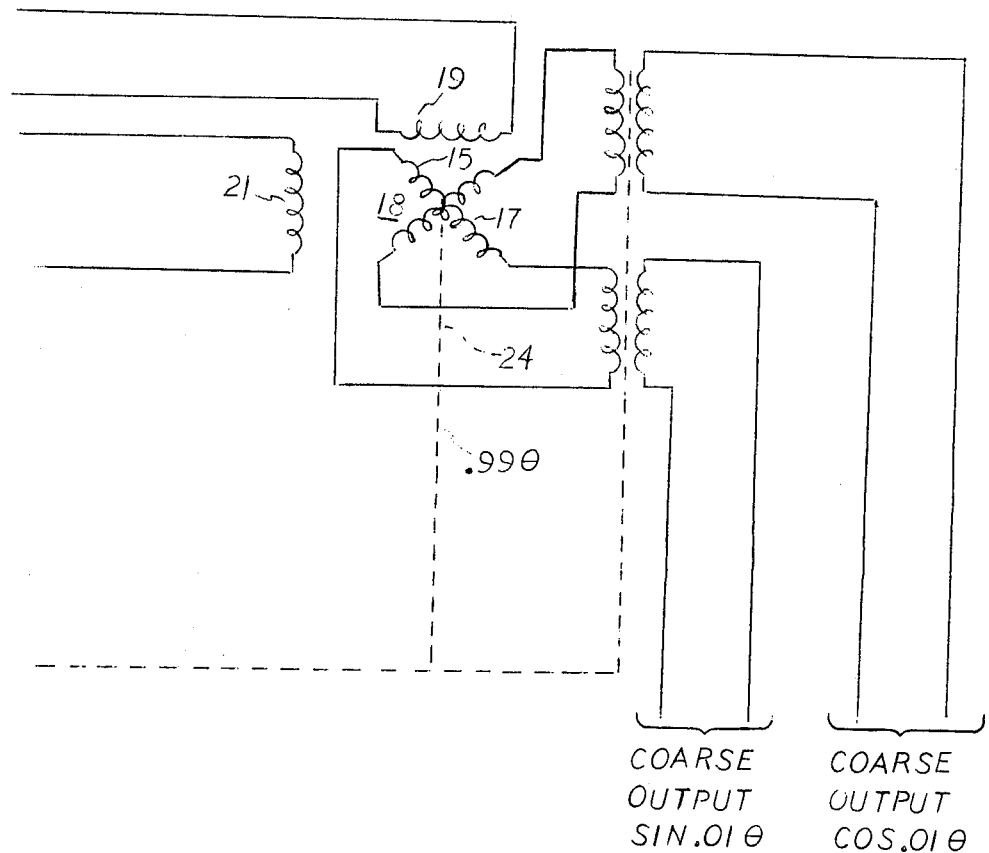
FIG. 6 is similar to a portion of FIG. 5 but illustrating the input to the brushless coarse resolver being through the stator windings.

Resolver 14 has a rotor winding 9, disposed on the rotor 12, and stator windings 11 and 13. If resolver 14 has two rotor windings, one can be left open circuited and the other 9 can be supplied with the reference or carrier. As explained previously, the reference provides no information, and is only used to carry the desired angular information in the sine and cosine form. The output from the stator windings 11 and 13 provides the cosine of theta and the sine of theta, respectively. This is fed to the input rotor windings 15 and 17 on resolver 18. Stator windings 19 and 21 provide an output which is in sine and cosine form and represents the difference between the mechanical input to rotor 24 and the electrical input applied through rotor windings 15 and 17. The inputs to rotor windings 9, 15 and 17 shown in FIG. 2 are by brushes and slip rings 23. As shown in FIG. 5, the brushes and slip rings 23 can be eliminated by using brushless resolvers which utilize rotary transformers for input and output of the resolver rotating windings. The stator winding and rotor windings can be used interchangeably as far as inputting or outputting of angular information is concerned. That is, either the rotor or the stator can be the input windings or output windings. FIG. 6 shows an embodiment wherein the input to the coarse resolver is through the stator and the output is from the rotor.

As explained above, when the input shaft 10 is rotated through an angle theta, the input shaft 24 of coarse resolver 18 is rotated through an angle of theta times $N_1/N_2$. The output of fine resolver 14 indicated along lines 50 and 52 in FIG. 1, is the sine of theta and the cosine of theta, respectively. This sine of theta and cosine of theta signal is fed to the input of coarse resolver 18 and the output of coarse resolver 18 along lines 54 and 56 is the sine of theta over $K$ and the cosine of theta over $K$, respectively [where $K$ is equal to the teeth $N_2$ of gear 22 divided by the teeth $N_2$ of gear 22 minus the teeth $N_1$ of gear 20; expressed mathematically $K = N_2/N_2 - N_1$)].

Thus, it can be seen that the ratio $K$ can have any value desired by properly selecting the gears 20, 22.

For example, if 100:1 ratio between the coarse resolver 18 and the fine resolver 14 is desired, this is accomplished by connecting the shafts of the two resolvers 14 and 18 through a 99:100 ratio which causes the coarse resolver 18 to revolve at a speed of 0.99 times the input angle theta. This can be accomplished by selecting gear 20 to have 99 teeth and gear 22 to have 100 teeth. Thus connected, the single-pass gear ratio connecting the shafts of the two resolvers provides a rotation of the input shaft 24 of coarse resolver 18 through an angle of 0.99 theta. As previously described, resolver 18 acts as an angle subtractor by subtracting the mechanical rotation of its shaft 24 from the electrical input corresponding to the sine and cosine of the angle impressed on its rotor windings 15 and 17. That is, electrical output of coarse resolver 18 will correspond to the electrical input theta minus the mechanical input 0.99 theta, or the output is equal to 0.01 theta represented in sine and cosine form. Represented mathematically the angular output to the coarse resolver 18 equals theta $- N_1/N_2$ times theta, which equals theta $(1 - N_1/N_2)$. Hence with the 100:1 reduction, $N_1$ equals 99 and $N_2$ equals 100 and the quantity $N_1/N_2$ equals 0.99. The coarse angle output is 0.01 theta and this is precisely the same output that was derived from the prior art two-speed resolver system which employed six gears and two bearing systems. In some applications only, a coarse indication of position over multiple revolutions is required, in this case the output of the fine resolver, which isn't fed to the coarse resolver, need not be used. Since the gear reducer is a major cost in a unit having a high ratio, it is economical to use the teaching of this invention even if the output of the fine resolver is not required. As can be seen in the disclosed two-speed resolver system, only two gears 20 and 22 are required to achieve this overall ratio.

It can easily be seen that numerous ratios of $K$ can be achieved by appropriately choosing the ratio of $N_1/N_2$. In all cases, $N_1/N_2$ can theoretically be achieved by using only two gears. Accordingly, the desired ratio of $K$ is equal to $N_2$ divided by $(N_2 - N_1)$. Thus the ratio $N_2$ divided by $N_1$ for any value of $K$ is equal to $N_1/N_2 = (K - 1)/K$. Thus, for example, for $K = 16$, $N_1/N_2 = 15$ divided by $16 = 30$ divided by $32 = 60$ divided by 64. Thus, it can be seen that any ratio of gears 20, 22 would yield the fraction 15/16 will produce $K$ of 16. This will result in the output of the fine resolver 14 yielding the sine of theta and the cosine of theta and for an invention utilizing the teaching of this disclosure, the coarse resolver 18 will yield sine of theta divided by 16 and cosine of theta divided by 16.

Utilizing the teaching of the present invention a method of using two resolvers 14 and 18 for indicating the position of a member rotatable through multiple revolutions is apparent. One resolver 14 is connected directly to the rotatable member for providing an output signal indicative of the angular position of the rotatable member over a revolution. The second resolver 18 is then connected to the rotatable member through a suitable mechanical speed changer to rotate at a predetermined different speed. Electrical connections are then made between the output of the first resolver 14 and the input of the second resolver 18 to feed the electrical output signal of the first resolver 14 to the input of the second resolver 18. The output signal of the second resolver 18 then provides an output signal indicating a predetermined degree of rotation for every rotation of the rotor of resolver 18.

What is claimed is:

1. A two-speed resolver for indicating the exact position of a shaft rotatable through multiple revolutions comprising:
   a first brushless resolver having a mechanical input connected to the shaft and an electrical output providing a signal indicating the position of the shaft;
   a second brushless resolver having a mechanical input, an electrical input, and an electrical output;
   mechanical connecting means connecting the mechanical input of said first resolver to the mechanical input of said second resolver for moving the mechanical input of said second resolver at a different rate than the mechanical input of said first resolver as the shaft is rotated;
   electrical connecting means for feeding the signals indicating the position of the shaft from the electrical output of said first resolver to the electrical input of said second resolver so that the electrical output of said second resolver provides a signal indicating the algebraic sum of the mechanical input to said second resolver and the position of the shaft as indicated by the output signal of said first resolver 2. A two-speed resolver as claimed in claim 1 wherein said mechanical connecting means comprises:
   a first gear attached to the mechanical input of said first resolver;
   a second gear having a different number of teeth than said first gear attached to the mechanical input of said second resolver engaging said first gear to rotate the mechanical input to said second resolver at a rate different than the mechanical input of said first resolver as the mechanical input of the first resolver is rotated.

3. A two-speed resolver as claimed in claim 1 wherein when the input shaft is rotated through an angle theta, the electrical output of said first resolver provides a signal indicating the sine of theta and the cosine of theta and the electrical output of said second resolver provides a signal indicating the sine of theta divided by $K$ and the cosine of theta divided by $K$ wherein $K$ is determined by the rotation of the mechanical input to the first resolver divided by the rotation of the mechanical input to said second resolver minus the speed of the mechanical input to said first resolver when the shaft is rotated.

4. A two-speed resolver as claimed in claim 2 wherein when the input shaft is rotated through an angle $\theta$, the electrical output of said first resolver provides sin $\theta$ and cos $\theta$ and the electrical output of said second resolver provides sin $(\theta/K)$ and cos $(\theta/K)$ wherein $K = N_2/(N_2$ $- N_1$) and $N_2$ is the number of teeth of said second gear and $N_1$ is the number of teeth of said first gear.

5. Apparatus for indicating the absolute angular position of a shaft rotatable through an angle theta which can be greater than 360° comprising:
   a first brushless resolver connected to the shaft and providing an electrical output indicating the angular position theta;
   a second brushless resolver having an input shaft, an electrical input, and an electrical output;
   a first gear disposed on the input shaft of said first resolver having $N_1$ teeth;
   a second gear on the input shaft of said second resolver having $N_2$ teeth and engaging said first gear so that the input shaft of said second resolver rotates at a speed of $N_1$ divided by $N_2$ times the speed of the input shaft to said first resolver; and
   electrical connecting means for connecting output of said first resolver to electrical input of said second resolver so that the electrical output of said second resolver provides an output signal indicating an angular position of theta (1 $- N_1/N_2$).

6. Apparatus as claimed in claim 5 wherein:
   said first resolver provides an electrical output indicating the sine of theta and cosine of theta; and
   said second resolver provides an electrical output indicating sine of (theta divided by $K$) and cosine of (theta divided by $K$) wherein $K = N_2/(N_2 - N_1)$.

7. Position indicating means for determining the absolute position of a member comprising:
   first resolver means having a brushless rotor connected to the member and an electrical output providing electrical signals indicating the angular position of the member;
   second resolver means having a brushless rotor, electrical input means, and electrical output means for determining the difference between the angular position of its rotor and angular position information imposed on its electrical input means;
   mechanical interconnecting means for rotating the rotor of said second resolver means at a rate proportional to but different from the rotation of the rotor of said first resolver means; and
   signal conductor means connecting the output of said first resolver means to the input of said second resolver means for feeding the signals indicating the position of the member from said first resolver means to said second resolver means.

8. Angular position indicating means as claimed in claim 7 wherein said mechanical interconnecting means comprises:
   a first gear having $N_1$ teeth secured to the rotor of said first resolver means;
   a second gear having $N_2$ teeth secured to the rotor of said second resolver means engaging said first gear to revolve the rotor of said second resolver means at a rate of $N_1/N_2$ of the speed of the rotor of said first resolver means; and wherein said signal conductor means comprises,
   electrical conductor means connecting the electrical output of said first resolver to the electrical input of said second resolver so that the electrical output of said second resolver provides a signal indicating a rotation of 1 $- N_1/N_2$ for every revolution of the rotor of said first resolver.

9. A two-speed resolver as claimed in claim 8 wherein:
   theta represents the angular position of the rotor of said first resolver with respect to a predetermined position and said first resolver provides an output signal indicating sine of theta and the cosine of theta;
   the electrical input of said second resolver comprises a pair of windings wound on the rotor and electrical output of said second resolver comprises a pair of stator windings which give an output signal equal to sine of (theta over $K$) and cosine of (theta over $K$) where $K$ is equal to $N_2$ divided by ($N_2 - N_1$).

10. A two-speed resolver as claimed in claim 8 wherein:
    theta represents the angular position of said first resolver rotor and said first resolver provides an electrical output signal indicating the sine of theta and the cosine of theta; and
    one input of said second resolver comprises a pair of stator windings and brushless rotary transformers, and the output of said second resolver comprises a pair of rotor windings which provide sine and cosine output indicating a predetermined fraction of a revolution for each revolution of the input shaft.

11. A method of using two brushless resolvers for indicating the position of a member rotatable through multiple revolutions comprising the steps of:
    connecting one brushless resolver directly to the rotatable member for providing an output signal indicating angular position of the rotatable member over each revolution;
    connecting mechanically the second brushless resolver to the rotatable member to be rotated at a predetermined different rate than the input to the first resolver; and
    feeding the electrical output of the signal of the first resolver to the electrical input of the second resolver so that the second resolver determines the difference between its electrical and mechanical input and provides an output signal indicating a predetermined degree of rotation for every rotation of the rotor of the first resolver.

12. A method of using two brushless resolvers for indicating position of a rotatable member as claimed in claim 11 wherein:
    the rotor of the second brushless resolver is connected to rotate at a predetermined fraction of the rate of rotation of the rotor of said first resolver; and
    the second resolver is connected to subtract the mechanical input of the rotor from the electrical input which is the output of the first resolver and provide signals indicating the angular position representing the difference.

* * * * *

UNITED STATES PATENT AND TRADEMARK OFFICE
CERTIFICATE OF CORRECTION

PATENT NO. : 4,060,799
DATED : November 29, 1977
INVENTOR(S) : Donald H. Jones

It is certified that error appears in the above-identified patent and that said Letters Patent are hereby corrected as shown below:

In the Abstract, line 4, "ofthe" should read --of the--.

Column 5, line 23, after "fine" --resolver-- should be inserted; line 41, "two-shaped" should read --two-speed--.

Column 6, line 5, "of" third occurrence should read --or--.

Signed and Sealed this

Eighteenth Day of April 1978

[SEAL]

Attest:

RUTH C. MASON
Attesting Officer

LUTRELLE F. PARKER
Acting Commissioner of Patents and Trademarks